Patented Mar. 18, 1930

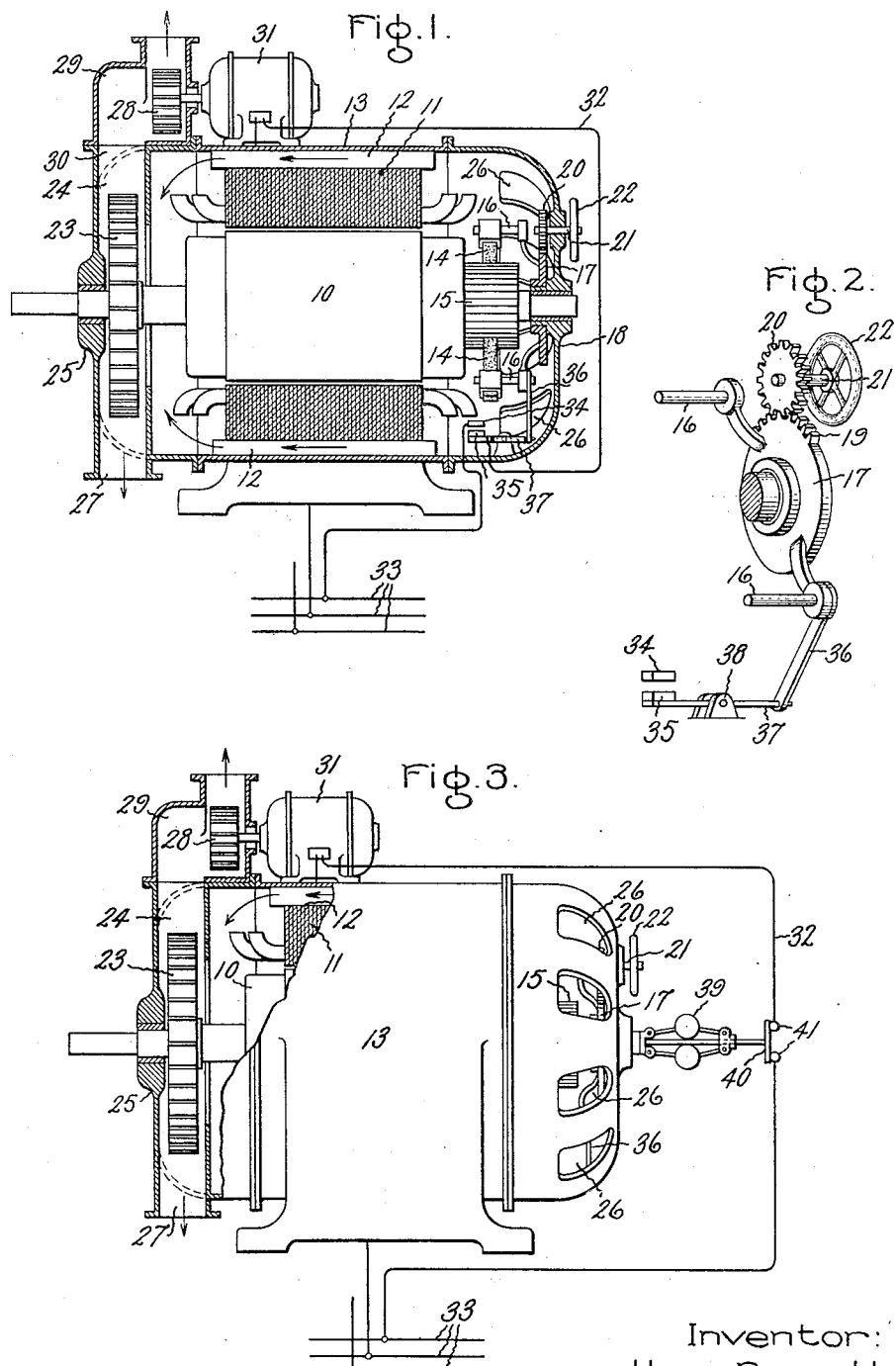

1,751,424

UNITED STATES PATENT OFFICE

HANS ROSENTHAL, OF BERLIN, GERMANY, ASSIGNOR TO GENERAL ELECTRIC COMPANY, A CORPORATION OF NEW YORK

VENTILATING ARRANGEMENT FOR DYNAMO-ELECTRIC MACHINES

Application filed December 20, 1928, Serial No. 327,431, and in Germany April 25, 1928.

My invention relates to ventilating arrangements for dynamo-electric machines.

It has heretofore been the practice in dynamo-electric machines operable over a wide range of speed to ventilate them, either by a fan or blower driven by the machine which varied the amount of air circulated through the machine approximately in accordance with the cube of the speed thereof, or by a separate blower which supplies a substantially constant amount of air to the machine irrespective of the speed thereof. It is objectionable to depend entirely on a fan or blower driven by the machine for ventilation because if the fan is designed to circulate an adequate quantity of air through the machine at normal running speed thereof it will not circulate a sufficient quantity at slow speeds. On the other hand, if the fan is arranged to circulate a quantity of air sufficient to cool the machine at slow speeds, it supplies an excessive amount of air when the machine is running at normal speed which results in a decrease in efficiency of the machine. This is due to the fact that the amount of air supplied to the machine by the fan varies approximately as the cube of the speed thereof so that when the speed of the machine varies the amount of air supplied thereto by the fan varies as the cube of the speed. It is also unsatisfactory to supply air for ventilation by driving the fan or blower at constant speed independently of the machine, because the actual amount of air required for ventilating the machine varies in accordance with the speed thereof, so that if the fan is adjusted to give adequate ventilation at normal speed, it will not give enough ventilation at slow speeds.

The object of my invention is to provide a ventilating arrangement for dynamo-electric machines operable over a wide range of speed which will supply an amount of cooling air varying in accordance with the speed of the machine, so that the machine will be adequately ventilated without supplying an excess amount of air thereto at any speed. I accomplish this by providing a dynamo-electric machine having a ventilating system including a main air circulating arrangement for the system driven by the machine and an auxiliary air circulating arrangement controlled by the speed of the machine for supplementing the main air circulating means when the machine is being operated at slow speed.

My invention will be more fully set forth in the following description referring to the accompanying drawing, and the features of novelty which characterize my invention will be pointed out with particularity in the claims annexed to and forming a part of this specification.

In the drawing Fig. 1 is a longitudinal section of a variable speed alternating-current brush-shifting motor embodying my invention; Fig. 2 is a perspective view of the brush-shifting mechanism, and Fig. 3 is a side elevation partly broken away embodying a modification of the form of my invention shown in Fig. 1.

Referring to the drawing I have shown my invention in connection with an alternating current brush-shifting motor having an armature 10 arranged in a field structure 11 provided with longitudinally extending air passages 12 and supported in a frame 13. The brushes 14 of the machine bear on the commutator 15 and are adjustably supported on insulated brush studs 16 which are secured to a plate 17 rotatably mounted on the end-head 18 of the motor, so that the brushes can be shifted to vary the speed of the machine. In order to facilitate shifting of the brushes I form a sector of gear teeth 19 on the periphery of the plate 17 and arrange a gear 20 in mesh therewith which is supported by a shaft 21 having an adjusting wheel 22 for shifting the brushes.

The machine is ventilated at maximum speed thereof by means of a fan 23, which is secured to the shaft of the armature 10 and is arranged in a casing 24 formed in the end-head 25 of the motor. This fan draws air into the machine through the openings 26 in the end head 18 and circulates the same through the ducts 12 and the remainder of the machine and then discharges the air through the opening 27 formed in the outlet 27 of the casing 24.

The fan 23 is designed to circulate through the machine only the amount of air required to adequately cool the machine at full speed. It will thus be seen that when the brushes 14 are shifted so as to decrease the speed of the machine that there will be a marked decrease in the amount of air flowing therethrough, as the capacity of the fan decreases in proportion to the cube of the speed thereof. In accordance with my invention, therefore, I provide auxiliary means for supplementing the fan 23 when the machine is operating at slow speed so as to provide adequate ventilation. This may be done in various ways but the particular arrangement which I have shown includes a fan 28 arranged in the casing 29 communicating with the outlet 30 of the casing 24. I provide a motor 31 for driving the fan 28 and connect the same to a suitable supply circuit 33 through conductor 32 and the contacts 34 and 35 of a suitable switch. In order to render the fan 28 inoperative when the machine is running at full speed, and render the same operative when the machine is running at slow speed, I connect the movable contact 35 to one of the brush-stud supports by means of a link 36 and a lever 37 which is pivotally supported at 38 in the end-head 18 of the machine. This linkage is arranged so that when the brush-shifting wheel 22 has shifted the brushes to a position corresponding to maximum speed of the machine the contact 35 will be out of engagement with the fixed contact 34 as shown in Figs. 1 and 2 and when the wheel 22 is manipulated to shift the brushes 14 so as to decrease the speed of the machine the contact 35 will move into engagement with the contact 34 and thereby complete the circuit to the motor 31. In this way the fan 28 is caused to supplement the fan 23 when the machine is operating at slow speed so that the machine is adequately ventilated throughout its entire range of variation of speed.

In the modification of my invention shown in Fig. 3 the construction is the same as that shown in Fig. 1 except that the ciruit to the motor 31 is controlled in accordance with changes in speed of the motor by a fly-ball governor 39 which is secured to the armature shaft, and which is provided with a bridging member 40 adapted to engage contacts 41 in the circuit between the motor 31 and the supply circuit 33. The fly-ball governor 39 is constructed so that the bridging member 40 remains in engagement with the contacts 41 until the machine reaches approximately full speed. By this construction the fan 23 is used to ventilate the machine when it is running at full speed and the fan 28 is used to supplement the fan 23 so as to adequately ventilate the machine when it is running at slow speed.

Modifications of the forms of my invention, which I have disclosed, will occur to those skilled in the art so that I do not desire my invention to be limited to the particular arrangements disclosed, except as defined in the appended claims.

What I claim as new and desire to secure by Letters Patent of the United States, is:

1. A dynamo-electric machine operable over a wide range of speed having a ventilating system including main air-circulating means for said system driven by said machine, means for varying the speed of said machine, and auxiliary air-circulating means controlled by the speed varying means of said machine for supplementing said main air-circulating means when said machine is being operated at slow speed.

2. A dynamo-electric machine operable over a wide range of speed having a ventilating system including a main fan driven by said machine, means for varying the speed of said machine, an auxiliary fan for said system and a motor for driving the same, and means actuated in accordance with the operation of said speed varying means for controlling said motor to cause said auxiliary fan to supplement said main fan when the said machine is running at slow speed.

3. A dynamo-electric machine operable over a wide range of speed having a ventilating system including a main fan driven by said machine, means for varying the speed of said machine, an auxiliary fan for said system and a motor for driving the same, and means actuated in accordance with the operation of said speed varying means for controlling said motor to cause said auxiliary fan to supplement said main fan when the said machine is running at slow speed.

4. A commutating dynamo-electric machine operable over a wide range of speed having a ventilating system including a main fan driven by said machine and an auxiliary fan, means for shifting the brushes of said machine to vary the speed thereof, and means actuated by said brush-shifting means for controlling said auxiliary fan to supplement said main fan when said machine is operating at slow speed.

5. A commutating dynamo-electric machine operable over a wide range of speed having a ventilating system including a main fan driven by said machine and an auxiliary fan having a motor for driving the same, means for shifting the brushes of said machine to vary the speed thereof, and means actuated by said brush-shifting means for controlling said motor to cause said auxiliary fan to supplement said main fan when said brush-shifting means is adjusted to operate the machine at slow speed.

In witness whereof, I have hereunto set my hand this 1st day of December, 1928.

HANS ROSENTHAL.